July 1, 1958 — N. J. MERCER — 2,840,846
HOLLOW INSULATED HANDLE
Filed March 7, 1957
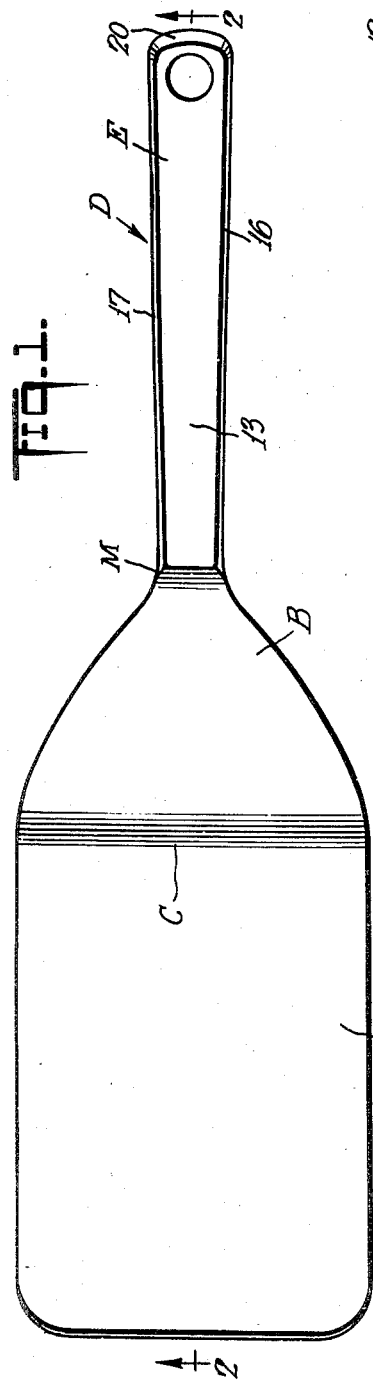
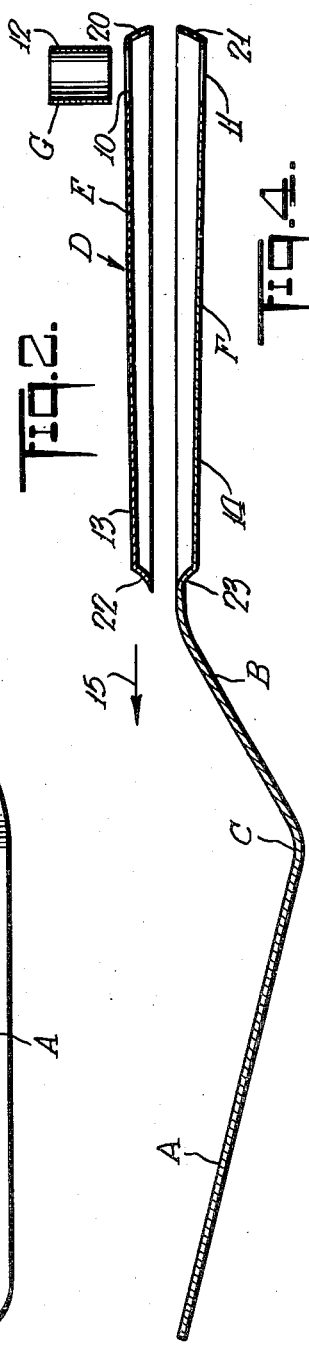
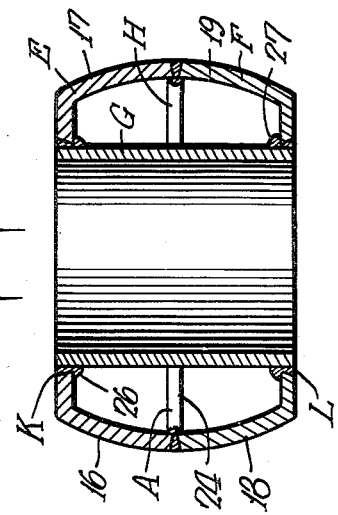
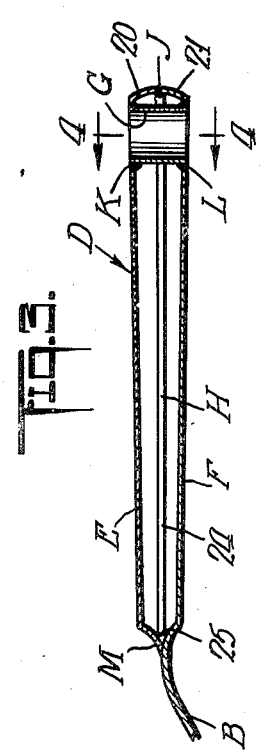
INVENTOR
Norman J. Mercer
BY
ATTORNEY United States Patent Office 2,840,846
Patented July 1, 1958

2,840,846

HOLLOW INSULATED HANDLE

Norman J. Mercer, New York, N. Y.

Application March 7, 1957, Serial No. 644,677

1 Claim. (Cl. 16—116)

The present invention relates to kitchen tools and, although not limited thereto, it particularly relates to a kitchen tool handle construction.

Although certain aspects of the present invention are particularly adapted to the construction of knives, forks and spoons and broadly to the handles, blades and/or shanks thereof, the present invention has a particular application to relatively large sized kitchen tools and particularly kitchen tools of the character which have shank portions or blade portions of substantial size and which are utilized for handling relatively large food particles or food products, as contrasted to individually used knives, forks and spoons.

It is among the objects of the present invention to provide a sanitary, readily made, basic kitchen tool construction which will have a substantially unitary integral shank and handle construction, and in which the shank or blade will constitute substantially a continuation of one or both sides of the handle.

Another object is to provide a novel kitchen utensil of the character described which will be of hollow handle construction, yet not made of tubing, and in which said hollow handle construction will have an insulating pocket of air, while at the same time the entire tool is of maximum strength, although having relatively thin wall sections and blade and shank sections.

A further object is to provide a novel, sanitary kitchen utensil having a substantially larger size than the usual, individually used knives, forks and spoons, and which is designed for handling relatively large food particles or bodies and which will have an attractive streamlined appearance without any crevasses, recesses or burrs which would be likely to collect dirt, dust, grease or food particles.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory, according to one embodiment of the present invention, to form a handle structure of two shells, each of which constitutes about half of the depth of the handle member, which are desirably joined at one end by a through tubular sleeve and at the other end by a throat connection to a shank or blade.

In the desired form of the invention the outside seams are soldered or welded together, and, less preferably, are braised together, with the external seam being ground away so that the external side edges of the handle, as well as the end of the handle, the connection to the tubular insert and the junction at the throat have all been smoothly ground away to form an external body structure which is substantially devoid of crevasses or any other recesses that might tend to engage or hold dirt, grease or food particles.

Interiorly of the hollow handle, which desirably will contain a rarified air body, since it will be enclosed while the heating and sealing operations are going on, there will be a relatively thick bead extending along the seams, giving a reinforcement and rigidity to the handle, even though such handle be formed of relatively thin wall sections or relatively thin sheet metal.

In order to give the desired reinforcement at the ends of the handle, the tubular element at one end is formed separately from the handle shells and is welded, soldered or braised in position, while at the other end the throat portion is welded by a similar welding, soldering or braising operation.

The interior bead will remain in position even when the exterior sealing edges are ground off so as to reinforce the structure.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

Fig. 1 is a top plan view of a kitchen utensil shown by way of being a flat, wide blade but capable of taking many other shapes and forms.

Fig. 2 is a longitudinal sectional view taken upon the line 2—2 of Fig. 1 with the various elements being separated or exploded from each other as they appear before they are joined together.

Fig. 3 is a longitudinal side sectional view similar to Fig. 2 showing the final handle construction with the interior beading.

Fig. 4 is a transverse vertical sectional view taken upon the line 4—4 of Fig. 3 and upon an enlarged scale as compared to Fig. 3.

Referring to Fig. 1, there is shown a relatively large blade portion A which may be replaced by spoon, spatula, fork or other kitchen utensil or tool members. This blade A has a shank portion B to which it may be attached by riveting, braising or welding but to which it is integrally joined in the embodiment shown at C.

The handle structure D has an upper shell E and a lower shell F and a tubular insert G.

The two handle shells E and F and tubular insert G are joined together by welding, soldering or braising along the side seams H, the under seam J and the circular upper and lower seams K and L, as well as at the throat seam M.

The blade element A—B—C may be made separate from the handle shells E and F and joined at the throat seam M but in the preferred form it is made integral with one of the shells E or F, the shell F being shown as being integral with the blade in Fig. 2 by way of example.

In the embodiment shown, the shells E and F are formed of relatively thin sheet metal, such as stainless steel, or, less preferably, other stain and rust resistant thin metal sections.

Holes are cut into the shells, as indicated at 10 and 11, to receive the sleeve 12, which is desirably of thicker metal or of greater gauge.

The shells are desirably formed so that they will have relatively flat top and bottom faces 13 and 14 which converge or come closely together in the direction indicated by the arrow 15 toward the shell portion and they have conforming curved arcuate side edges 16 and 17 and 18 and 19 forming portions of a cylinder, which meet together at the junction seam lines H.

The end of the handle away from the direction 15 also has the curved faces 20 and 21 which join together at the end seam J and which constitute a part of a cylinder.

Adjacent the throat seam M the ends of the handle shells in the direction 15 will be provided with the inwardly curved portions or concave portions 22 and 23 which are joined together at the junction seam M.

When the shell sections E and F and the tube G are formed together there will be relatively thick metal beads extending both interiorly, as indicated at 24, 25, 26 and 27, as well as exteriorly.

The exterior B sections will, however, be ground off and then buffed off so that the sides and ends of the handle and throat are absolutely smooth and no trace of the welding appears. As a result, the exterior of the shell will have an absolutely smooth finished appearance devoid of any cracks, crevasses or recesses in which any dirt, grime, grease or food particles might lodge.

The handle D, although of relatively thing sheet metal, will nevertheless be very rigid and strong and will not be subject to rupture or breaking stress, even though subjected to considerable handling and abuse in the kitchen of the house, hotel, residence or club.

The tool will have an attractive appearance, be readily cleaned and washed, and the handle will be relatively cool, even when the blade portion is handling hot food materials.

It will be noted that in joining the shells together the side seams H will be first welded together with the tube seams K and L being last welded.

The high heat produced will result in an expansion and rarification of the air in the handle, and the air will largely escape through the openings 10 and 11 and around the tube G. When the welds are finally made around the seams 26 and 27, most of the air will have been driven out of the interior of the handle because of the high heat applied thereto.

The welding at 26 and 27 around the ends of the tube G will result in final sealing of the hollow handle, and when it cools down the interior air will be so rarified as to constitute a relative vacuum, as compared to the outside air, and give the handle a non-conductive effect, with only the blade throat portion at M being sufficient to conduct heat away from the blade into the handle section, and this will be limited by the weld at M and the extra body of metal at 25.

As many changes could be made in the above kitchen tool construction, and many widely different embodiments of this invention could be made without departure from the score of the claim, it is intended that all matter contained in the above description shall be interpreted as illustrative and not in a limiting sense.

Having now particularly described and ascertained the nature of the invention, and in what manner the same is to be performed, what is claimed is:

A kitchen tool having an integral unitary hollow handle construction composed of upper and lower elongated handle shells integrally joined at the side edges thereof and having a tool shank member integrally joined to one end of said handle construction, said hollow handle having a rarified air body shank for insulating purposes, said rarified air body resulting from elevating the temperature of the handle shells when integrally joined, followed by welding them while the air therein is in highly heated condition, said handle also being reinforced at one end thereof by a transverse tubular element welded at its ends to the base portions of the handle shells, said handle shells having converging flat top and bottom faces which converge toward the shank member, and having arcuate side and end edges forming parts of the section of a cylinder, said upper and lower shells being welded along the side and end edges thereof and said welds being ground off so that there are smooth external faces with the interior bead portions of said welds constituting longitudinal reinforcement.

References Cited in the file of this patent

UNITED STATES PATENTS

| | | |
|---|---|---|
| Re. 2,585 | Halsted | Apr. 30, 1867 |
| 200,033 | Edgar | Feb. 5, 1878 |
| 564,728 | Vacheron | July 28, 1896 |
| 1,637,853 | Brown | Aug. 2, 1927 |
| 1,747,660 | Burns | Feb. 18, 1930 |

FOREIGN PATENTS

| | | |
|---|---|---|
| 153,841 | Great Britain | Nov. 18, 1920 |